(12) United States Patent
Alban et al.

(10) Patent No.: US 8,465,570 B2
(45) Date of Patent: Jun. 18, 2013

(54) METHOD FOR THE PURIFICATION OF A GAS CONTAINING $CO_2$

(75) Inventors: Bruno Alban, Massy (FR); Christophe Claeys, Limours (FR); Philippe Court, Paris (FR); Arthur Darde, Paris (FR); Guillaume De Smedt, Antony (FR); Bao Ha, San Ramon, CA (US); Vladimir Hasanov, Rueil-Malmaison (FR); Simon Jallais, Chaville (FR); Christian Monereau, Paris (FR); Serge Moreau, Velizy Villacoublay (FR); Elise Renou, Chaville (FR); Ivan Sanchez-Molinero, Versailles (FR); Jean-Pierre Tranier, L'Hay-les-Roses (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 549 days.

(21) Appl. No.: 12/668,536

(22) PCT Filed: Jul. 8, 2008

(86) PCT No.: PCT/FR2008/051273
§ 371 (c)(1),
(2), (4) Date: Jun. 10, 2010

(87) PCT Pub. No.: WO2009/010690
PCT Pub. Date: Jan. 22, 2009

(65) Prior Publication Data
US 2010/0263529 A1    Oct. 21, 2010

(30) Foreign Application Priority Data

Jul. 13, 2007   (FR) .................................... 07 56491

(51) Int. Cl.
*B01D 53/02*   (2006.01)
(52) U.S. Cl.
USPC .......................... 95/39; 95/41; 95/96; 95/148
(58) Field of Classification Search
USPC ............... 95/39, 41, 96, 148; 96/130
See application file for complete search history.

(56) References Cited

U.S. PATENT DOCUMENTS

| | | | |
|---|---|---|---|
| 4,952,223 A * | 8/1990 | Kirshnamurthy et al. | ...... 62/626 |
| 4,969,338 A | 11/1990 | Kirshnamurthy et al. | |
| 5,100,635 A * | 3/1992 | Krishnamurthy et al. | .... 423/235 |
| 6,136,283 A | 10/2000 | Stern | |

FOREIGN PATENT DOCUMENTS

| | | |
|---|---|---|
| DE | 19613376 | 10/1996 |
| EP | 0469781 | 2/1992 |
| EP | 1308196 | 5/2003 |
| EP | 1332786 | 8/2003 |
| FR | 2884305 | 10/2006 |
| JP | 6099034 | 4/1994 |

OTHER PUBLICATIONS

Search Report for PCT/FR2008/051273.

* cited by examiner

*Primary Examiner* — Robert A Hopkins

(57) ABSTRACT

A method for the purification of a feed gas stream containing at least $CO_2$ and at least one impurity with by the incorporation of a purification step, enabling water to be at least partially removed is provided.

34 Claims, 1 Drawing Sheet

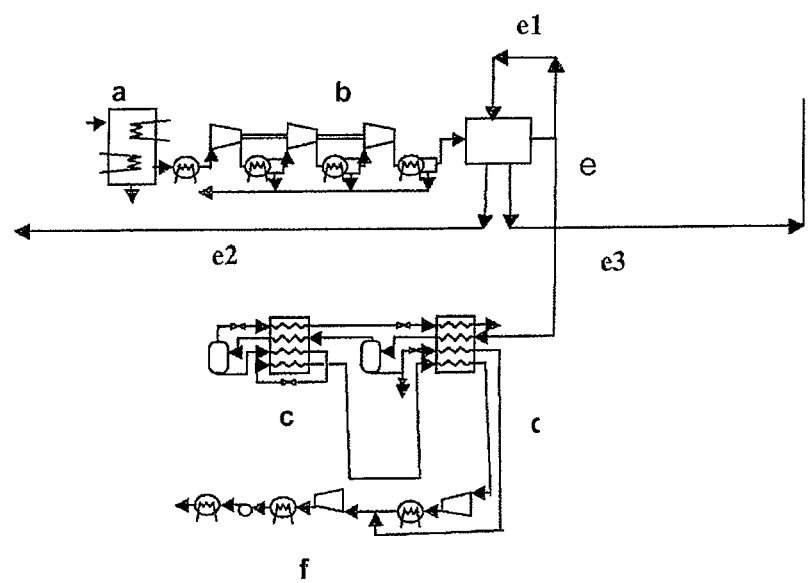

METHOD FOR THE PURIFICATION OF A GAS CONTAINING $CO_2$

This application is a §371 of International PCT Application PCT/FR2008/051273, filed Jul. 8, 2008.

FIELD OF THE INVENTION

Background

The invention relates to a method for the purification of a feed gas stream containing at least $CO_2$ and at least one impurity characterized by the incorporation of a purification step, enabling water to be at least partially removed.

It consists more precisely of the development of a complete method for treating $CO_2$ coming from oxycombustion (combustion with pure oxygen or with a gas leaner in nitrogen than is air) of an industrial nature, enabling it to be packaged for transport and storage for various uses.

In point of fact, gases from the combustion of fossil fuels and/or biomass or from waste incineration or gases from glass furnaces mainly contain heavy metals such as mercury, arsenic, iron, nickel etc, organic contaminants and compounds of the SOx or NOx type.

Solutions exist for treating contaminants at atmospheric pressure in which atmospheric discharges are regulated ($SO_2$, NOx, Hg and CO for example).

For example, document EP-A-1 332 786 describes a method for the purification of a gas stream by eliminating NOx, SOx, Hg, and HgO by oxidation with ozone.

In addition, it is known from document EP-A-1 308 198 to eliminate mercury by gas-liquid contact in the presence of $H_2S$. Flash distillation of the liquid phase provides a gas rich in mercury that is trapped by adsorption on $Al_2O_3$, $TiO_2$, $SiO_2$, active carbon or zeolite, doped with sulfur-containing compounds.

However, these methods do not guarantee complete elimination of the contaminants treated but aim at a limiting content discharged to atmosphere, such as required by the specifications in place.

In addition, they treat fumes from combustion with air, that are less concentrated since they mainly contain nitrogen. In point of fact, if the stoichiometry of combustion reactions is considered, the quantity of oxygen (oxidant) to be provided is determined by the quantity of fuel. Also, if air is used and not pure oxygen, given that there is only 21% oxygen in this air, it is necessary to enter a much higher flow in order to guarantee an identical concentration of oxygen so as to carry out this combustion under correct conditions. Thus, the streams are more dilute and nitrogen is therefore found in a large quantity in the fumes since it is the main component of air (~78%).

Now, the application for capturing and storing $CO_2$ coming from oxycombustion creates supplementary requirements for purification from other compounds and/or these same compounds in different proportions.

In point of fact, this application of capturing and storing $CO_2$ coming from oxycombustion requires not only treatment to remove large quantities compounds that are not in the majority, but also a thorough purification treatment ("polishing") for the product that aims at eliminating impurities that are prejudicial for all the method as well as for the storage of this $CO_2$ in suitable geological strata.

Starting from this, a problem presented is to provide an improved method for the purification of a gas stream containing $CO_2$, namely a method guaranteeing intensive elimination of the contaminants treated, in particular a thorough elimination of water.

SUMMARY OF THE INVENTION

The invention's solution is therefore a method for the purification of a feed gas stream containing $CO_2$ and at least one impurity chosen from water, nitrogen, oxygen, argon, rare gases, SOx, $CS_2$, $H_2S$, NOx, HCN, HCl, $CHCl_3$, HF, volatile organic compounds and the following metals: mercury, arsenic, iron, nickel, tin, lead, cadmium, vanadium, molybdenum and selenium and compounds derived from these metals, comprising the following successive steps:

a) a step of preheating the feed gas stream aimed at eliminating, at least partially, one of the impurities;

b) a step of compressing the preheated gas stream to a pressure of between 10 and 50 bar;

c) a step of eliminating, at a temperature <5° C., at least one impurity, present in the compressed gas stream, chosen from nitrogen, oxygen, argon and rare gases with the aid of exchangers combined with separators;

d) a step of recovering a purified $CO_2$-rich gas stream in the liquid, gaseous or supercritical state;

characterized in that, between steps a) and c), a purification step is carried out enabling water contained in the gas stream to be at least partially eliminated.

The pre-treatment step a) may be any purification step designed to remove at least one solid, liquid or gaseous constituent. This purification step is situated upstream of at least one compression phase and if the feed gas stream is oxycombustion fumes, this purification step is also situated downstream of the oxycombustion furnace.

Separators are understood to mean equally gas-liquid separators of various types (gravity separators, with or without a coalescing system, cyclones etc) and/or distillation columns of any type (stripper, distillation column, washer, dephlegmator etc) of which the materials leaving may be in liquid or vapor form. Separation may also consist of separation by deliberate deposition of a solid that is then cyclically revaporized.

According to the case, the method according to the invention may have one of the following features:
- after step d), the gas stream is in the liquid state and is stored, or is in the supercritical state and transported and/or stored, or in the gaseous state and transported;
- the purification step makes it possible to eliminate, at least partially, at least one other impurity chosen from nitrogen, oxygen, argon, rare gases, SOx, $CS_2$, $H_2S$, NOx, HCN, HCl, $CHCl_3$, HF, volatile organic compounds, the following metals, mercury, arsenic, selenium, cadmium, iron, and nickel carbonyl, and compounds derived from these metals, preferably at least partially SOx;
- the purification step is carried out between step a) and b);
- the purification step is carried out between step b) and c);
- the compression step b) comprises successive compression phases and the purification step is carried out between two successive compression phases of said compression step b);
- the purification step is carried out at a pressure of between 2 bar absolute and 25 bar absolute, preferably between 3 and 9 bar absolute, and even more preferably between 3.5 and 6 bar absolute;
- in the purification step, one or more organic or inorganic materials are employed for at least partially eliminating water contained in the gas stream;

in the purification step, one or more organic or inorganic materials are also employed that are identical to or different from those for eliminated water, for eliminating at least partially at least one impurity chosen from nitrogen, oxygen, argon, the rare gases, SOx, $CS_2$, $H_2S$, NOx, HCN, HCl, $CHCl_3$, HF, volatile organic compounds, the following metals: mercury, arsenic, selenium, cadmium, iron, and nickel, and compounds derived from these metals, preferably at least partially SOx;

the organic or inorganic materials are adsorbent materials;

the adsorbent materials are employed in at least one fluidized bed reactor;

the adsorbent materials are employed in at least one fixed bed reactor;

at least fluidized bed or falling bed reactor in the regeneration phase corresponds to each fluidized bed reactor in the adsorption phase;

all the reactors are subjected to the same cycle of the PSA, VSA or TSA type;

at least one of the reactors is subjected to a TSA cycle and at least one of the reactors is subjected to a PSA cycle;

at least one reactor is subjected to a TSA cycle and a PSA cycle at the same time;

at least one residual gas is recovered during the purification step;

in the purification step, a first residual gas is recovered having an NOx content T1 and a second residual gas having an NOx content T2, such that T2<T1;

the first residual gas is recycled in an oxy-furnace;

at least one residual gas, preferably the first residual gas, is recycled upstream of the purification step in the main stream. In fact, the recycled residual gas may be recycled anywhere upstream of the second liquid water outlet. This liquid water outlet may be in the low pressure washing or washings of the pre-treatment step, in condensers situated between two compression phases or in a washing tower, optionally at high pressure, situated downstream of the compression step;

the second residual gas is either discharged directly to atmosphere or treated and then discharged to atmosphere;

the second residual gas is treated by washing and/or refrigeration followed by gas-liquid separation;

at least one portion of the gas stream enriched in $CO_2$ coming from the purification step enables at least part of the adsorbent materials of the purification unit to be regenerated;

a carbon bed is employed in the purification step and said spent carbon is mixed with fuel in an oxycombustion furnace;

the feed gas stream is an oxycombustion fume;

the volatile organic compounds are chosen from formaldehyde, acetaldehyde, formic acid, acrolein and acetic acid;

the pre-treatment comprises at least one of the following treatments: catalysis, filtration, washing and desulfuration, it being possible for washing to be coupled with cooling of the feed gas.

The term "oxycombustion" is understood to mean combustion during which coal is burned in a nitrogen-lean fluid that may extend from pure oxygen (>95%) to a fluid containing the same quantity of oxygen as air (around 21%) obtained by mixing pure oxygen (>95%) with recycled $CO_2$-rich fumes.

The invention will now be described in greater detail.

As an example, a TSA method for purifying a gas mixture may comprise the following steps:

1) purifying a gas mixture by adsorbing impurities at superatmospheric pressure and at ambient temperature;
2) depressurizing the adsorber to atmospheric pressure,
3) regenerating the adsorbent at atmospheric pressure at a temperature usually between 100 and 250° C. by means of one or more heat exchangers;
4) cooling the adsorbent to ambient temperature;
5) repressurizing the adsorber.

BRIEF DESCRIPTION OF THE FIGURES

FIG. 1 illustrates one embodiment of the present invention wherein the location of the purification step is at the end of the compression cycle, namely between steps b) and c).

FIG. 1 shows a device for carrying out a method according to the present invention characterized by the location of the purification step at the end of the compression cycle, namely between steps b) and c).

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The object of step a) of the present invention is to treat fumes by using known methods forming part of the state of the art. Washings are currently known using various liquids (or solvents) such as water, alcohols (methanol for example), amine solutions, basic solutions etc, these being the most conventional ones, but there are many others, or there are desulfuration units or filtration units.

It will also be noted that washing in particular washing with water, may be coupled with partial cooling of the feed gas stream, then providing a triple function of condensation of the heaviest compounds, adsorption of the more soluble compounds and retention of solid particles, in particular those containing metal compounds.

The gas coming from step a) may generally contain:

a large majority of $CO_2$ (generally greater than 80%);

nitrogen oxides, called NOx, such as NO, $NO_2$, $N_2O_4$ etc;

sulfur oxides, called SOx, such as $SO_2$, $SO_3$, $H_2SO_4$ etc;

water at saturation (under the temperature and pressure conditions of the stream). In point of fact, almost all the treatment methods in the first step specify that the gas is to be contacted with an aqueous solution;

oxygen at a level of several percent (stemming from an excess relative to the stoichiometry necessary for ensuring correct combustion efficiency);

CO (unburned in combustion);

non-condensable matter relative to $CO_2$: nitrogen, argon, oxygen and the rare gases derived mainly from air inputs to the oxycombustion furnace and from the oxygen purity;

heavy metals such as mercury, arsenic, iron, nickel, tin, lead, cadmium, vanadium, molybdenum, selenium and compounds derived from these metals;

volatile organic compounds (VOC) and unburned hydrocarbons.

Then, during the second step b), the gas stream is compressed to a pressure level sufficient to enable, on the one hand, part of the undesirable compounds making up this to be separated (separators generally situated immediately after each compression step followed by heat exchange for cooling the gas stream in order to eliminate condensables that appear during this cooling, water for example) and, on the other hand, to bring the gas to the correct conditions (of temperature and pressure) in order to prepare for the elimination of other impurities during the following steps.

A penultimate step c) will be the elimination of non-condensable compounds. This third step may be optimized if it is carried out at a low temperature, that is to say at a temperature <5° C., preferably at a negative temperature, even more preferably between −20° C. and −60° C. with the aid of exchangers combined with separators in a cold cycle.

The object of the fourth step d) is then to recover the purified $CO_2$-rich gas stream.

However, in the third step c), the temperature level generally used, which is below 0° C., means that there must be a reduction in water content, and possibly in some other compounds that are not sufficiently retained during the pre-treatment step or during any successive compressions and condensations. In point of fact, the presence of water or of these other compounds capable of being deposited in equipment, such as for example heavy hydrocarbons, sulfur-containing compounds or nitrogen-containing compounds etc would prevent suitably cold temperature levels to be reached in the penultimate step c), preferably of between −20° C. and −60° C., in order effectively to produce a stream of $CO_2$ with a concentration according to the standards in force. To produce effectively is understood to mean to produce at an overall cost encompassing investment and energy associated with this industrially acceptable production, in line with the expectations of international organizations.

Thus, it would appear that the purification step (called polishing) is indispensable between the first step a) that enables the feed gas stream to be pretreated with a view to its subsequent treatment and the third step c) that enables non-condensable compounds contained in the gas stream to be separated from $CO_2$.

This purification step may be replaced, all along the second step b) that aims at progressively compressing the gases in the vicinity of atmospheric pressure to the required pressure, mainly with a view to separating inert materials from the majority $CO_2$.

As a result of this, the choice of the location of the purification step will be a function of a certain number of criteria, such as investment, the type of materials in the second step b), the nature and concentration of impurities etc.

The first possibility is to place the purification step at the start of step b), that is to say to carry out purification at low pressure.

However, this position brings about two disadvantages, namely:
  on the one hand, non-optimum purification, since the lower the operating pressure the smaller the quantity of impurities that an adsorber can retain, if an adsorption method is used for example; and
  on the other hand, not using liquid/gas separation that will be systematically positioned behind each compression stage making up the compression line (second step b)). In point of fact, these separations may make it possible to recover a considerable quantity of condensable molecules that have condensed during compression, such as for example the remaining water and volatile organic compounds. By doing this, the quantity of impurities to be eliminated following b) will be much smaller. Advantages will inevitably result that are not negligible in terms of investment on this purification step.

On the other hand, the position of the purification step upstream of the compressor line making up the second step b) makes it possible to envisage the removal of impurities that are prejudicial to the rest of the method: that is to say water, volatile organic compounds, metal-based compounds etc, and in addition it may result in some advantage as regards the nature of materials to be subsequently used, in particular in the compression steps.

The second possibility is to place the purification step between two compression stages of the second step b).

This second possibility makes it possible in point of fact to have gas available at a pressure intermediate between that which is close to atmospheric (at the start of the second step b)) and that maximum that is required in the third step c) of the method. A large reduction in the volume installed inevitably results and therefore a large reduction in the cost of the unit compared with an installation upstream of the compression step.

This is all the more true if the purification step is moved toward the end of the second step. In point of fact, there is a risk of water constituting the key element in dimensioning the purification unit employed in step e) (in the case of cyclic adsorption for example). On the one hand, the compression step or steps upstream of the purification step enable(s) water to be condensed, reducing still further the quantity of water to be stopped in the purification step and therefore the volume of adsorbent for said purification. On the other hand, an increase in pressure makes it possible to reduce the actual volume of gas to be treated and enables the section of the passage and/or pressure losses to be optimized compared with low pressure purification.

The compression step b) makes it possible to bring the feed gas stream to a pressure such that at least one of the condensable gases can be eliminated. This pressure lies between 10 and 50 bar, according to the quantity of non-condensable materials and the specification for impurities in the $CO_2$ produced. The pressure upstream of the compression step is close to atmospheric pressure.

In the general case where the compression step b) comprises successive compression phases and where the purification step is placed between two successive compression steps, said purification will be operated between 2 and 25 bar abs, preferably between 3 and 9 bar abs and even more preferably between 3.5 and 6 bar abs. The type or types of compressors will be chosen according to the flow rate and the pressures from conventional compressor types. The exact staging of pressures and the systematic presence or not of a cooler after each compression step will be optimized according to the number of machines and local economic conditions.

It will be noted that in the case where the purification step for removing water from the feed gas stream is situated between two compression stages, it is always possible to add supplementary purification means, preferably downstream of said purification step, for example means for trapping at least one heavy metal or a compound derived from a heavy metal at the final compression pressure.

The main disadvantage will come from the quantity of impurities that will be contained in the compression stages upstream of step c). It is therefore probable that the compressors will have to be adapted to the types of impurities.

Finally, the third possibility is to place the purification step at the end of the second step b).

Thus, in this present case, the volume of the purification unit employed in the purification step will be minimal, but the entire compression step b) will be carried out with the unpurified gas stream.

The choice of the locality of the purification step will then be made taking impurities into account (linked to a large extent to the raw material involved in oxycombustion, that is to say for example the nature of the coal), the effectiveness of the pre-treatment, their possible impact on stage b) of the method (compression) and the volume of the method to be installed.

The purification method will be chosen according to impurity or impurities to be stopped, their quantity and the economic considerations that may be pertinent to the project (existence of utilities, synergy with neighboring units etc). The more conventional methods for removing impurities from a gas that will be subjected to a low temperature treatment are washings (absorption), refrigeration/condensation and/or crystallization at ambient temperature, catalysis, chemisorption and adsorption.

In the majority of cases, adsorption appears to be the most competitive solution. It is not excluded that the purification step consists of several sub-steps, a sub-step being based for example on an adsorption method.

In addition, various technologies may be employed for contacting gas molecules with adsorbent material in the purification step. Each of these technologies may present advantages and disadvantages that may make them of interest in a method for the treatment of a gas stream containing $CO_2$ coming from oxycombustion, according to the invention.

Three types of technology may be employed.

The first technology lies in the employment of fixed bed adsorption. The gas to be purified passes through a stack of adsorbent particles, also called a fixed bed, which will progressively retain molecules and, in so doing, purify the gas. Several types or grades of adsorbents may be used mixed or in superimposed layers, according to the impurities to be removed and their proportions, so as best to use the adsorption/desorption properties of each adsorbent. It only remains afterwards to regenerate the adsorbent, that is to say to remove the molecules retained so that it may adsorb once more. Thus, all methods that use adsorption have an intrinsically cyclic nature, both types of adsorption and regeneration constituting the main steps of the cycle.

These methods may also be characterized and named according to the regeneration of adsorbents. The means of regeneration is generally imposed by the nature of bonds established between molecules and adsorbent. The stronger they are the greater the energy provided to break them.

Thus, the following may be found among absorption methods:

methods of the PSA (Pressure Swing Adsorption) type. Thus, the driving force for desorption is the pressure difference between the adsorption phase and that of regeneration. The pressure of the latter is then above atmospheric pressure.

methods of the VSA (Vacuum Swing Adsorption) type. While using the same principle as seen previously, it consists of exaggerating the pressure difference while maintaining an even lower regeneration pressure, and therefore one that is sub-atmospheric.

methods of the TSA (Temperature Swing Adsorption) type. In this case, use is made of the fact that increasing the temperature will reduce the quantity adsorbed.

These various adsorption methods for gas streams preferably have two adsorbers functioning alternately, that is to say one of the adsorbers is in a production phase while the other is in a regeneration phase.

The TSA type method is generally the most sure means of completely regenerating a contaminated adsorbent and remains quite a simple method.

On the other hand, PSA and VSA methods may be complicated and consequently optimized at will. The cycles are generally provided with many complementary steps, all known to a person skilled in the art (such as balancing between bottles etc). Modulating and linking them makes it possible to optimize any type of method.

PSA and VSA methods may even be combined since VPSA is referred to. The "driving force" of the method is increased by raising the pressure at adsorption P and by reducing this in regeneration using vacuum V.

In the case of the present invention, it may also be valuable to combine the effects of temperature and pressure. PTSA could therefore be referred to. In point of fact, a higher temperature may prove indispensable for regenerating an adsorbent contaminated with water. Generally, molecules that are polar or not very volatile are strongly adsorbed on adsorbents that are specific to them. Thus, for example, hydrogen bonds that will be established for holding water on an adsorbent such as alumina or silica gel, or indeed the interaction of water with cations in the case of a zeolite may only be broken by a high energy input. This will be the objective for a hot gas and therefore at a high temperature that will be conveyed in counter-current. Nevertheless, other molecules may not require this temperature and then pressure alone will be sufficient. Thus, by astutely combining various elements of the method, it will be possible to optimize the performance of the method.

Two solutions may be employed for combining a TSA and a PSA.

The first solution consists of employing at least one adsorber subjected to a TSA cycle and at least one adsorber subjected to a PSA cycle. The main advantage lies in the use of two different regeneration modes. Thus, since only the TSA will be regenerated with temperature, the energy expended for all the separation will be minimized. On the other hand, this will be achieved to the detriment of investment costs linked to the employment of two different methods and the more difficult operation, given that it consists of two independent methods.

The second solution consists of employing at least one adsorber subjected at the same time to a TSA cycle and a PSA cycle. Thus, the adsorbent material or materials contained in said adsorber will be regenerated at the same time by pressure (depressurization) and by temperature (hot elution). The main disadvantage will come from the energy expended for regenerating all the adsorbent beds (not only that which would be required for absorbing water). Another disadvantage comes from the obligation to use adsorbents that are all capable of withstanding a high regeneration temperature. On the other hand, the advantages in terms of investment and operation are undeniable.

A possible variant of this second solution consists of dividing said adsorber into two parts and of regenerating one of the parts according to the TSA mode and regenerating the other part according to the PSA mode.

The advantages of using a method employing adsorption in a fixed bed lies essentially in the lower energy employed, given that gas-solid contact is achieved statically, and therefore without causing the solid to move. In addition, there is no need to have very advanced mechanical properties since it is only subject to its own weight in the adsorbent bed which is, and remains, static.

The great disadvantage of fixed bed technology lies in the fact that gradients will be established around and within the adsorbent particles that are static. Consequently, a certain number of resistances to material and heat transfer are encountered, as well as pressure losses that harm the adsorption performance. This problem may then be overcome by using the second technology.

The second technology lies in the employment of fluidized bed adsorption.

The gas to be purified passes through a fluidized bed, which is a bed in which the adsorbent is in permanent movement. Then, permanent renewing of molecules on the surface of the adsorbent particles makes it possible to maximize gradients and consequently to maximize the flow of material and heat transfers.

The performances of this type of method are better than those of methods employing fixed beds.

However, the main disadvantage comes from the fact that the adsorbent particles need to have quite advanced physical characteristics in order to be put quite easily in motion and to be prevented from being worn while regenerating dust from the adsorbent material. Attrition is then referred to. In point of fact, they should have an adequate size so that the gas can carry them, that is to say the speed of the gas should produce an ascending force on the particle greater than its weight.

In addition, the fluidized bed technique is comparable to the homogeneous reactor that has a different transfer function from a fixed bed reactor, notably as regards its capacity to lead to a very pure gas.

Moreover, the fluidized bed employed has to be stopped in order to regenerate it. It is in order to overcome this problem that the third technology may be used.

The third technology lies in the employment of at least one adsorber containing at least one fluidized bed and at least one regenerating reactor.

Thus, each adsorber in the adsorption phase corresponds to a reactor in the regeneration phase. The degree of circulation of the adsorbent makes it possible to regulate the purity of the gas.

The reactor in the regeneration phase may contain a single falling bed. In other words, the adsorbent material falls and is regenerated in contact with the regenerating gas.

The advantage of the falling bed lies in the simplicity of regeneration. However the dwell time for regeneration will be limited by the size of the apparatus. On account of this, limited performance is observed for this type of bed.

Another possibility is to employ a reactor in the regeneration phase with a fluidized bed.

On the other hand, with the falling bed, the fluidized bed makes it possible to control the dwell time for regeneration and on account of this to increase performance.

In addition, it is possible to incorporate the outlets from the purification unit within the chain for the treatment of $CO_2$.

For example, a part (e1) of the gas stream coming from the purification step may be used to regenerate the purification unit employed in this same step.

The regenerating gas itself, after having removed impurities trapped in the purification unit, may be recycled in its entirety or in part in the overall method.

The following example corresponds to the case where the purification unit is an adsorption unit of the TSA type, that is to say for which the preponderant effect for ensuring regeneration of the adsorbent is a temperature rise. As previously indicated, said regeneration will include a heating step, in a very general way a cooling step and possibly a depressurization step if regeneration is carried out at a pressure lower than that of the purification phase. Complementary steps may be added to these conventional steps such as for example sweeping of the adsorbent bed at ambient temperature. Similarly, the final heating temperature may be reached progressively via successive steps or a ramp. As an example, in order to desorb water from silica gel, the final temperature (HT) will be a priori within the range 120/200° C. and preferably between 140 and 175° C.

The regeneration step in the case of a TSA will last from one to several hours, probably a minimum of four hours in the majority of cases. According to their affinity for the adsorbents employed, the impurities stopped during the purification phase will be more or less easily desorbed and preferably leave during a period of the regeneration phase. For example, water stopped on silica gel will only be removed in a large quantity when the heat front will have passed in countercurrent through the main part of said adsorbent bed (from the form of the water front in the adsorber, the majority of the trapped water will be situated near the inlet on the adsorption side). Less strongly adsorbed impurities will have left previously or simultaneously as water starts to leave. On the other hand, the most adsorbed impurities such as some acids that may be formed as water is trapped (sulfuric acid for example) may leave after water when the regenerating gas becomes dry and approaches the inlet temperature (HT). During cooling, the stream leaving the adsorber has a composition close to that of the entering stream and contains few impurities. Starting with this, it may be of value to split the stream coming from the adsorber during the regeneration phases and to convey a certain part, at least partially, into different pieces of equipment. The fraction e2 rich in impurities will be directed towards combustion and the fraction e3 lean in impurities may be either discharged to atmosphere or treated and then discharged.

After possible condensation and separation of liquid water, a fraction of the regenerating gas, if it consists of initially purified $CO_2$, may be recycled into the main $CO_2$ stream. Said stream will be recycled at a suitable point taking into account its pressure, temperature and its impurity content. A fraction rich in impurities may be recycled for example upstream of pre-treatment while a fraction without any impurities may be reinjected at the compression stage corresponding to its pressure. It may be possible for example to adapt the regeneration pressure or pressures in order to use the various possibilities offered by the compression step to the best effect, for example to carry out cooling—or part of the cooling—at a pressure higher than with heating.

Thus, on the one hand certain harmful impurities will be removed in combustion and the entire desorbed stream will not have to be treated.

Moreover, among the components leaving the purification unit that may be introduced advantageously into the oxy-furnace, the following will be noted:

water of which the natural acidity will be compensated for in the combustion products by the natural alkalinity of the ash produced. At the same time, dissolved species will be destroyed or diluted in the same ash, which constitutes a natural purge of the system. Another possibility is to mix this water with fuel: for example in the form of a slurry or an emulsion for liquid fuels.

oxygen may be used as an oxidant.

nitrogen-containing compounds: $NO_2$, $N_2O$, $N_2O_3$, $N_2O_5$, HCN, $N_2O_4$. These types of compound may be destroyed by the oxy-furnace flame. In existing air furnaces equipped with a "burner", a fraction of the nitrogen-containing compounds produced in the main combustion is effectively destroyed during post-combustion.

organic compounds will be destroyed in the flame if they are introduced into the furnace. These compounds, concentrated in the purification unit, are for the most part toxic, mutagenic or carcinogenic.

other non-oxidized species or those in an intermediate oxidation state, such as CO, may be reintroduced into the furnace in order to be oxidized during combustion.

once heavy metals and compounds containing these are introduced into the furnace, they become distributed in the ash, which usually already contains the main part of them. In point of fact, most of the metallic trace elements remain in the ash and only a very minor part continues on their way in the fumes to the $CO_2$ purification unit.

As mentioned above, the organic compounds, concentrated in the purification unit, are for the most part toxic, mutagenic or carcinogenic. Also, if the purification step rests on adsorption, the adsorbents stopping organic compounds should be treated after use. The usual treatment for this purpose is incineration.

On account of this, one possibility is to employ, in the purification step, a succession of adsorption beds, notably including a carbon bed. A fraction of the trace components: heavy metals, organic and organometallic compounds present in the fumes are stopped there. After having served as an adsorbent, the carbon used is then periodically mixed with fuel in the oxy-combustion furnace and therefore used profitably as a fuel.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the purification of a feed gas stream, comprising;
    introducing a feed gas stream comprising $CO_2$, water and at least one impurity chosen from the group consisting of nitrogen, oxygen, argon, rare gases, $SO_x$, $CS_2$, $H_2S$, NOx, HCN, HCl, $CHCl_3$, HF, volatile organic compounds, and the following metals: mercury, arsenic, iron, nickel, tin, lead, cadmium, vanadium, molybdenum and selenium and compounds derived from these metals,
    a) pretreating the feed gas stream, thereby eliminating, at least partially, at least one of the impurities;
    b) compressing the pretreated gas stream to a pressure of between 10 and 50 bar;
    reducing the temperature of the compressed, pretreated gas steam to a temperature of <5° C.;
    c) eliminating at least one impurity present in the compressed gas stream with the aid of exchangers combined with separators, the impurity selected from the group consisting of nitrogen, oxygen, argon and the rare gases;
    d) recovering a purified gas stream enriched in $CO_2$ in the liquid, gaseous or supercritical state;
wherein, between steps a) and c), a purification step is carried out enabling water contained in the gas stream to be at least partially eliminated, and at least partially eliminating at least one other impurity chosen from the group consisting of nitrogen, oxygen, argon, the rare gases, $SO_x$, $CS_2$, $H_2S$, NOx, HCN, HCl, $CHCl_3$, HF, volatile organic compounds, the following metals, mercury, arsenic, selenium, cadmium, iron, and nickel, and compounds derived from these metals, wherein between steps a) and c), a purification step is carried out enabling water contained in the gas stream to be at least partially eliminated, and at least partially eliminating at least partially $SO_x$ and wherein the compression step b comprises successive compression phases and in that the purification step is carried out between two successive compression phases of said compression step b).

2. The method of claim 1, wherein after step d), the gas stream is in either the liquid state or the supercritical state, and stored.

3. The method of claim 1, wherein after step d), the gas stream is in either the supercritical state or the gaseous state, and transported.

4. The method of claim 1, wherein the purification step is carried out between step a) and step b).

5. The method of claim 1, wherein the purification step is carried out between step b) and step c).

6. The method as of claim 1, wherein the purification step is carried out at a pressure of between 2 bar absolute and 25 bar absolute.

7. The method of claim 6, wherein the purification step is carried out at a pressure of between 3 and 9 bar absolute.

8. The method of claim 7, wherein the purification step is carried out at a pressure of between 3.5 and 6 bar absolute.

9. The method of claim 1, wherein during the purification step, one or more organic materials are employed for at least partially eliminating water contained in the gas stream.

10. The method of claim 1, wherein during the purification step, one or more inorganic materials are employed for at least partially eliminating water contained in the gas stream.

11. The method of claim 9, wherein during the purification step, one or more organic materials are also employed that are identical to or different from those for eliminating water, for at least partially eliminating at least one impurity chosen from the group consisting of nitrogen, oxygen, argon, the rare gases, $SO_x$, $CS_2$, $H_2S$, NOx, HCN, HCl, $CHCl_3$, HF, volatile organic compounds, the following metals: mercury, arsenic, selenium, cadmium, iron, and nickel carbonyl, and compounds derived from these metals.

12. The method of claim 9, wherein during the purification step, one or more organic materials are also employed that are identical to or different from those for eliminating water, for at least partially eliminating $SO_x$.

13. The method of claim 10, wherein during the purification step, one or more inorganic materials are also employed that are identical to or different from those for eliminating water, for at least partially eliminating at least one impurity chosen from the group consisting of nitrogen, oxygen, argon, the rare gases, $SO_x$, $CS_2$, $H_2S$, NOx, HCN, HCl, $CHCl_3$, HF, volatile organic compounds, the following metals: mercury, arsenic, selenium, cadmium, iron, and nickel carbonyl, and compounds derived from these metals.

14. The method of claim 10, wherein during the purification step, one or more inorganic materials are also employed that are identical to or different from those for eliminating water, for at least partially eliminating $SO_x$.

15. The method of claim 9, wherein the organic materials are adsorbent materials.

16. The method of claim 10, wherein the inorganic materials are adsorbent materials.

17. The method of claim 15, wherein the adsorbent materials are employed in at least one fluidized bed reactor.

18. The method of claim 15, characterized in that the adsorbent materials are employed in at least one fixed bed reactor.

19. The method of claim 17, wherein at least one fluidized bed or falling bed reactor in the regeneration phase corresponds to each fluidized bed reactor in the adsorption phase.

20. The method of claim 17, wherein all the reactors are subjected to the same cycle of the PSA, VSA or TSA type.

21. The method of claim 20, wherein at least one of the reactors is subjected to a TSA cycle and at least one of the reactors is subjected to a PSA cycle.

22. The method of claim 20, wherein at least one reactor is subjected to a TSA cycle and a PSA cycle at the same time.

23. The method of claim 1, wherein at least one residual gas is recovered during the purification step.

24. The method of claim 23, wherein during the purification step, a first residual gas is recovered having an NOx content T1 and a second residual gas having an NOx content T2, such that T2<T1.

25. The method of claim 24, wherein the first residual gas is recycled in an oxy-furnace.

26. The method of claim 23, wherein at least one residual gas is recycled upstream of the purification step in the main stream.

27. The method of claim 23, wherein the first residual gas is recycled upstream of the purification step in the main stream.

28. The method of claim 24, wherein the second residual gas is either discharged directly to atmosphere or treated and then discharged to atmosphere.

29. The method of claim 24, wherein the second residual gas is treated by washing and/or refrigeration followed by gas-liquid separation.

30. The method of claim 15, characterized in that at least one portion of the $CO_2$-rich gas stream coming from the purification step enables at least part of the adsorbent materials of the purification unit to be regenerated.

31. The method of claim 15, wherein a carbon bed is employed in the purification step and said spent carbon is then mixed with fuel in an oxycombustion furnace.

32. The method of claim 1, wherein the feed gas stream is an oxycombustion fume.

33. The method of claim 1, wherein the volatile organic compounds are chosen from the group consisting of formaldehyde, acetaldehyde, formic acid, acrolein and acetic acid.

34. The method of claim 1, wherein the pre-treatment a) comprises at least one of the following treatments: catalysis, filtration, washing and desulfuration, it being possible for washing to be coupled with cooling of the feed gas stream.

* * * * *